US008139245B2

(12) United States Patent
Tian

(10) Patent No.: US 8,139,245 B2
(45) Date of Patent: Mar. 20, 2012

(54) MANAGING THE PROCESSING OF PRINT DATA AT PRINTING DEVICES BASED UPON AVAILABLE CONSUMABLE RESOURCES

(75) Inventor: Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1204 days.

(21) Appl. No.: 11/410,542

(22) Filed: Apr. 24, 2006

(65) Prior Publication Data

US 2007/0247654 A1  Oct. 25, 2007

(51) Int. Cl.
G06F 3/12 (2006.01)
G03G 15/00 (2006.01)

(52) U.S. Cl. ........ 358/1.15; 358/1.9; 358/2.1; 358/1.11; 358/1.14; 358/1.16; 358/1.17; 358/1.18; 358/296; 358/502; 358/401; 358/434; 358/443; 358/462; 358/465; 358/471; 399/1; 399/8; 399/27; 399/28; 399/42; 399/54; 399/58; 399/60; 399/66; 399/81; 399/109; 399/124; 399/190; 399/195; 399/223; 399/255; 399/267; 399/258; 399/376; 399/389; 347/19; 347/24; 347/43; 347/44; 347/54; 347/84; 347/85; 347/86; 347/93; 347/100; 347/112; 347/115; 347/117; 347/172; 347/197; 347/198; 347/214; 347/232

(58) Field of Classification Search .................. 358/1.9, 358/1.15, 434, 443, 462, 2.1, 1.11, 1.14–1.18, 358/296, 502, 504, 401, 465, 471; 399/1, 399/8, 27, 28, 42, 54, 58, 60, 66, 109, 124, 399/190, 195, 223, 255, 258, 376, 389; 347/19, 347/24, 43, 44, 54, 84–86, 93, 100, 112, 347/115, 117, 172, 197, 198, 214, 232

See application file for complete search history.

(56) References Cited

U.S. PATENT DOCUMENTS

| | | | | |
|---|---|---|---|---|
| 6,915,090 B2 * | 7/2005 | Fukaya | ........................... | 399/85 |
| 7,123,848 B2 * | 10/2006 | Clement et al. | ................. | 399/24 |
| 7,283,258 B1 * | 10/2007 | Kuno et al. | ................... | 358/1.13 |
| 7,307,744 B2 * | 12/2007 | Hikawa | ........................ | 358/1.14 |
| 2002/0054322 A1 * | 5/2002 | Geelen et al. | ................ | 358/1.15 |
| 2005/0276618 A1 * | 12/2005 | Clement et al. | ................. | 399/24 |

OTHER PUBLICATIONS

Xerox Office Group, "What is the true Office Productivity?", Xerox Corporation copyright 2005, 11 pages.

* cited by examiner

Primary Examiner — Steven Kau
(74) Attorney, Agent, or Firm — Hickman Palermo Truong & Becker LLP; Edward A. Becker

(57) ABSTRACT

An approach is provided for managing the processing of print data at a printing device based upon available consumable resources. A printing device includes a print process configured to determine consumable resources that are currently available at the printing device. The print process is further configured to determine which print data is to be processed based upon the consumable resources currently available at the printing device and the consumable resources required to completely process each of the print data. Print data that can be completely processed using the currently available consumable resources are selected for processing. The print process may also be configured to cause a notification to be provided to a client device to indicate the consumable resources currently available at a printing device and/or that insufficient consumable resources were available to process particular print data and to recommend other consumable resources to process the particular print data.

22 Claims, 7 Drawing Sheets

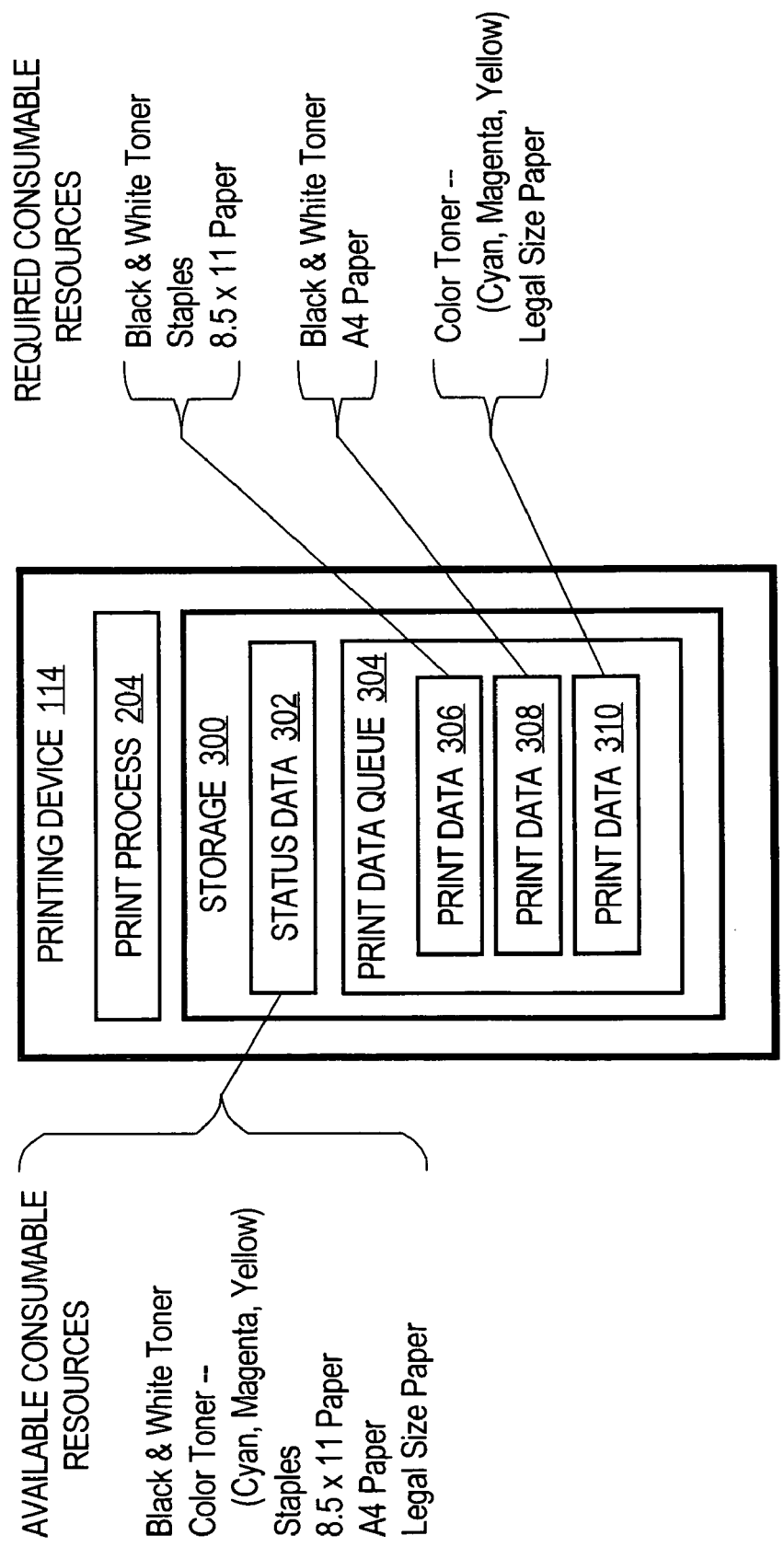

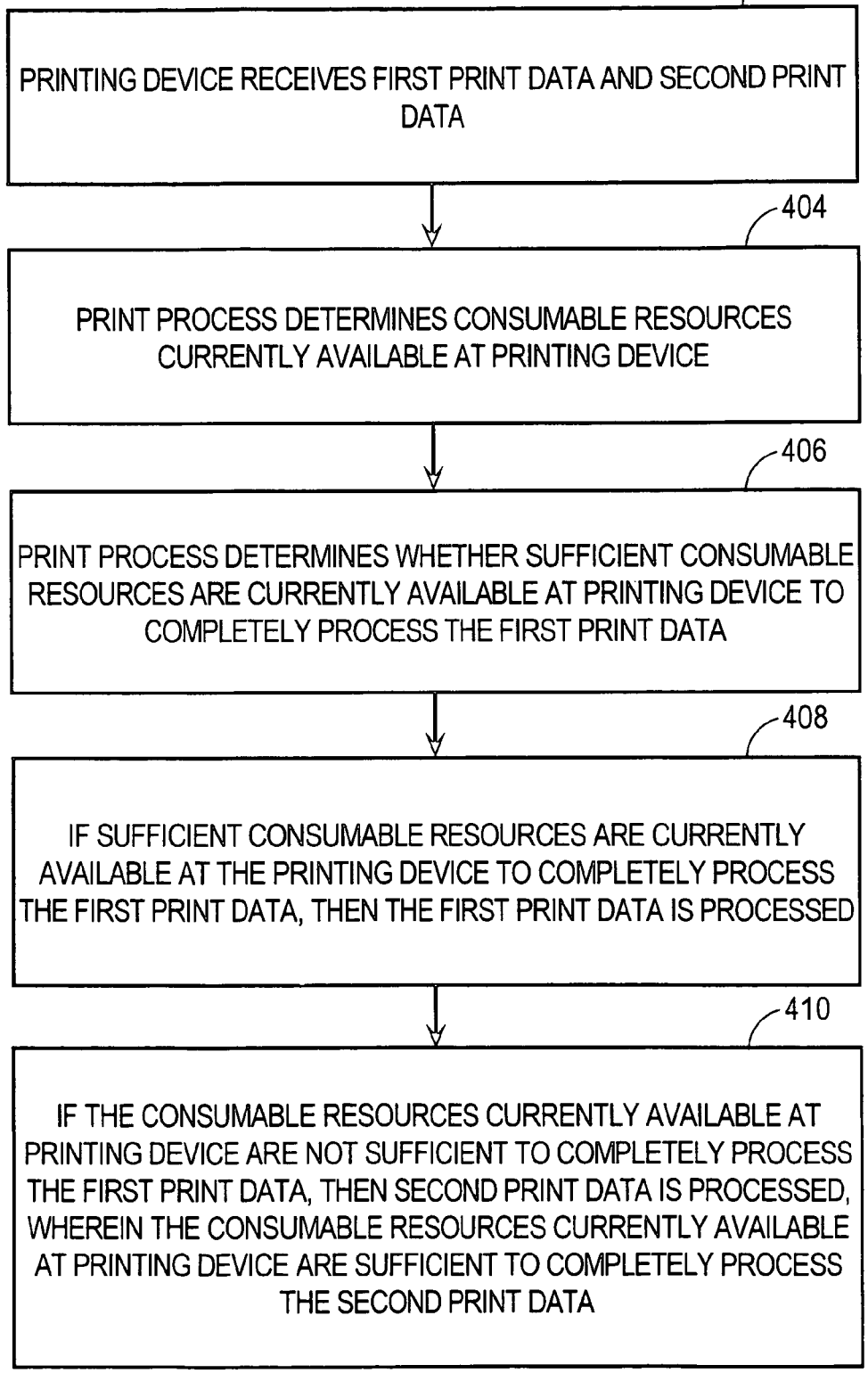

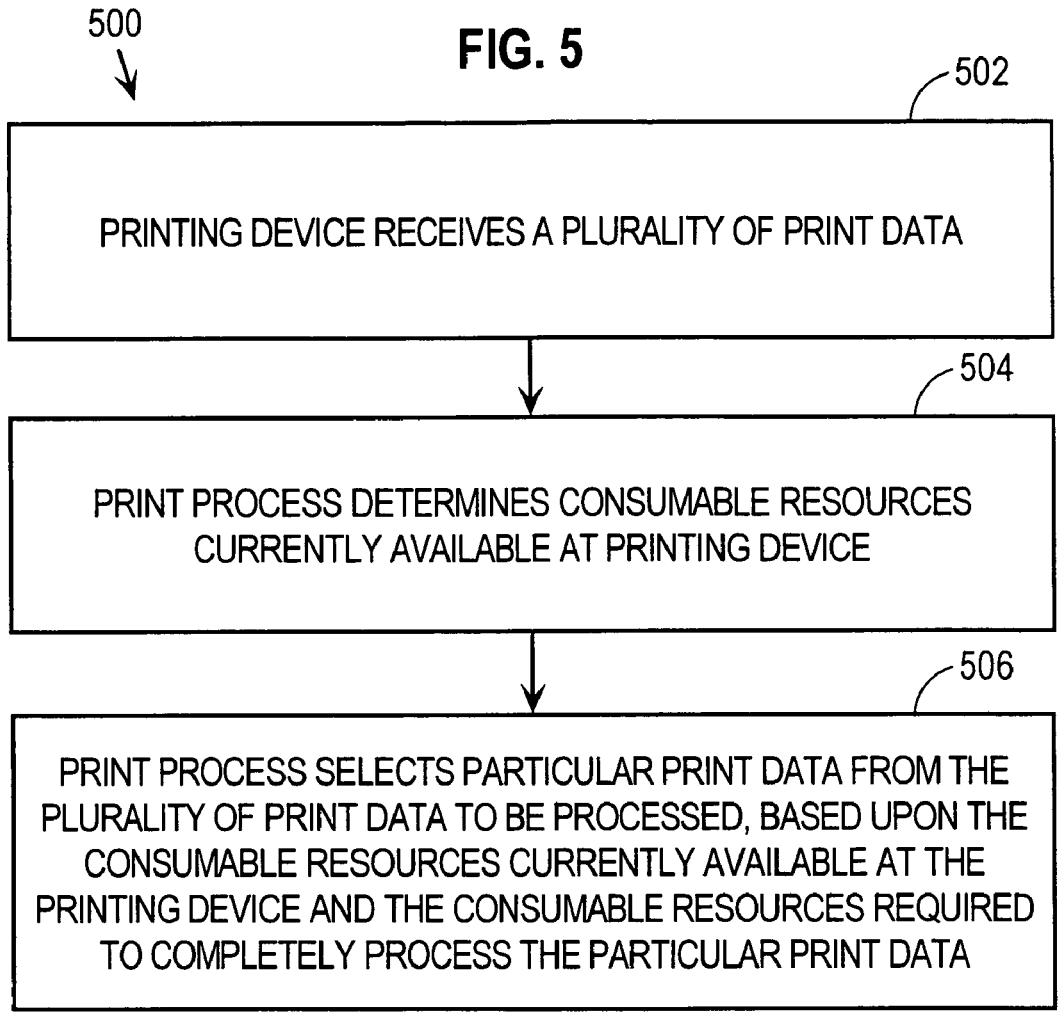

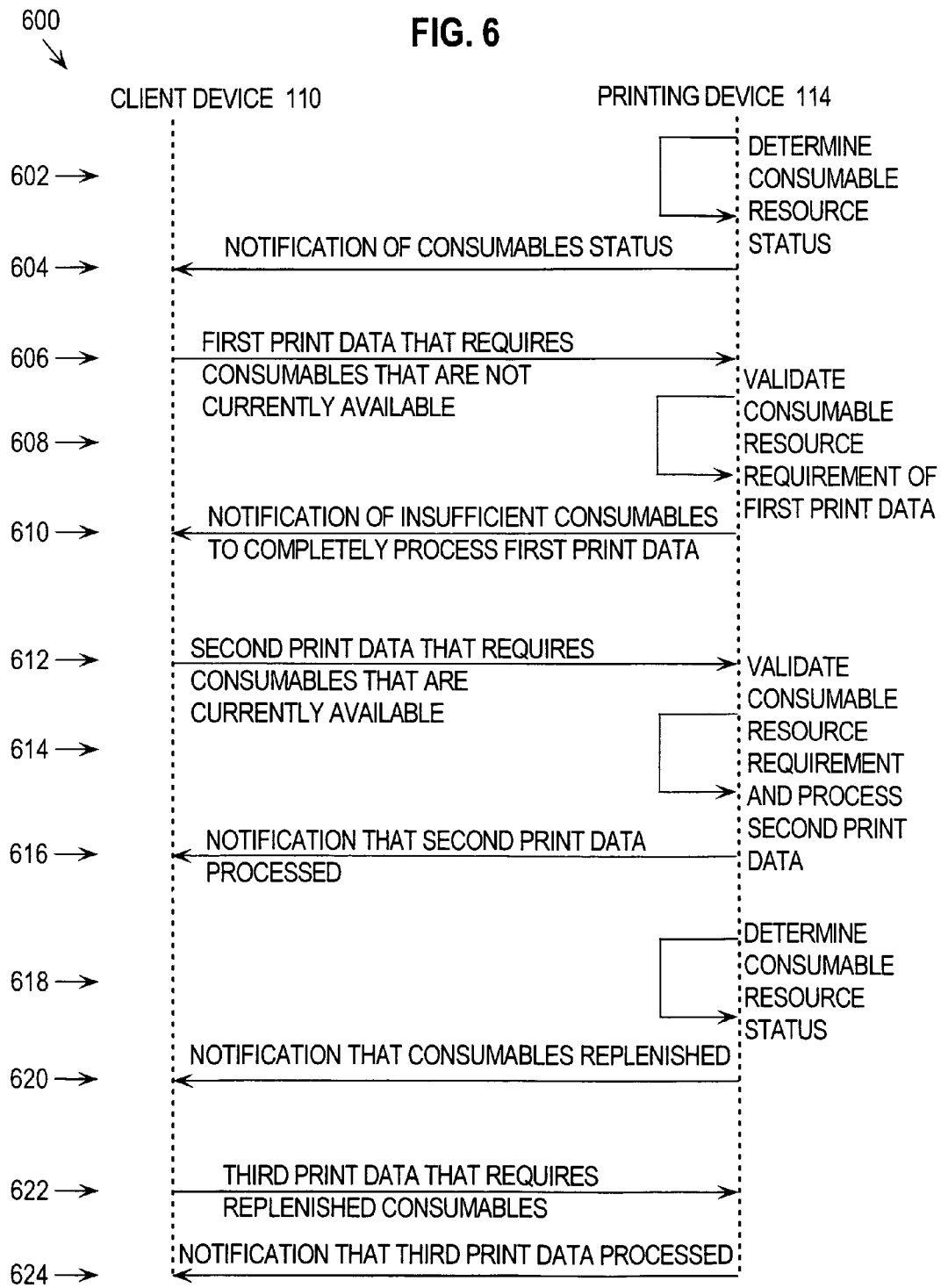

702 — PRINTING DEVICE RECEIVES FIRST PRINT DATA AND SECOND PRINT DATA

704 — PRINT PROCESS DETERMINES WHETHER A SUFFICIENT AMOUNT OF ONE OR MORE CONSUMABLE RESOURCES IS CURRENTLY AVAILABLE AT THE PRINTING DEVICE TO COMPLETELY PROCESS THE FIRST PRINT DATA

706 — IF A SUFFICIENT AMOUNT OF THE ONE OR MORE CONSUMABLE RESOURCES IS CURRENTLY AVAILABLE AT THE PRINTING DEVICE TO COMPLETELY PROCESS THE FIRST PRINT DATA, THEN PROCESSING THE FIRST PRINT DATA USING THE ONE OR MORE CONSUMABLE RESOURCES

708 — IF A SUFFICIENT AMOUNT OF THE ONE OR MORE CONSUMABLE RESOURCES IS NOT CURRENTLY AVAILABLE AT THE PRINTING DEVICE TO COMPLETELY PROCESS THE FIRST PRINT DATA, THEN DETERMINING ONE OR MORE OTHER CONSUMABLE RESOURCES THAT CAN BE USED

710 — GENERATE AND TRANSMIT A NOTIFICATION TO A CLIENT DEVICE

712 — RECEIVE CONFIRMATION DATA FROM CLIENT DEVICE AND PROCESS CONFIRMATION DATA

MANAGING THE PROCESSING OF PRINT DATA AT PRINTING DEVICES BASED UPON AVAILABLE CONSUMABLE RESOURCES

FIELD OF THE INVENTION

This invention relates generally to processing print data at printing devices and more specifically, to an approach for processing print data at printing devices based upon available consumable resources.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Contemporary network printing devices offer significant advantages over their prior stand alone printer counterparts. For example, contemporary network printing devices are typically sold with a network interface pre-installed and are very easy to configure. They also typically include a sophisticated computing platform and a large amount of memory to process the print data from a large number of users.

One of the problems with network printing devices is that they can suffer from "blockages" that cease processing of all print data. A blockage occurs when particular print data cannot be completely processed at a printing device because the printing device has insufficient consumable resources to completely process the particular print data. One classic situation when a blockage occurs is when a printing device runs out of paper while processing a particular print job. Until additional paper is added to the printing device, the current print data cannot be processed. Furthermore, no other print data can be processed until the required paper is added and the blockage cleared, even if the other print data does not require same paper that is currently depleted. For example, suppose that a printing device has received first print data and second print data and has started processing the first print data. Most printing devices process print data in the order in which it is received. Suppose further that the first print data requires 8.5×11 paper and that there is insufficient 8.5×11 paper in the printing device to completely process the first print data. Once the printing device has exhausted its supply of 8.5×11 paper, processing of the first print data ceases until additional 8.5×11 paper is added to the printing device. Even in situations where the second print data does not require 8.5×11 paper, processing of the second print data is blocked until sufficient 8.5×11 paper is added to allow the first print data to be completely processed. For example, the second print data may require A4 paper, but nevertheless cannot be processed once processing of the first print data has started and the blockage has occurred.

Printing devices sometimes include a notification mechanism to help resolve blockages as soon as possible. For example, some printing devices provide a local alert of the condition at the printing device, for example by providing a visual indication on a status bar and also possibly an audible notification to alert nearby personnel. Printing devices may also include a remote notification mechanism to alert the user who submitted the first print data or an administrative personnel that a blockage exists and what is required to address the blockage. Even local and remote notification mechanisms however, do not satisfactorily address the blockage problem. Based on the foregoing, there is a need for an approach for managing the processing of print data at printing devices that does not suffer from limitations of prior approaches for printing electronic documents.

SUMMARY

An approach is provided for managing the processing of print data at a printing device based upon available consumable resources. According to the approach, a printing device includes a print process configured to determine consumable resources that are currently available at the printing device. The print process is further configured to determine which print data is to be processed based upon the consumable resources currently available at the printing device and the consumable resources required to completely process each of the print data. Print data that can be completely processed using the currently available consumable resources are selected for processing. This approach improves the utilization of available consumable resources and reduces blockages attributable to an insufficient amount of consumable resources being available to process particular print data. The print process may also be configured to cause a notification to be provided to a client device. The notification may indicate the consumable resources currently available at a printing device. This allows users at client devices to manage when they submit print data to a printing device to avoid blockages by first ensuring that the target printing device currently has the consumable resources required to completely process print data. The notification may also indicate that insufficient consumable resources were available to process particular print data and to recommend one or more alternative consumable resources to be used to process the particular print data. The printing device may receive confirmation data from the client device that indicates whether a user of the client device wishes to use any of the recommended alternative consumable resources to process the particular print data.

According to one aspect of the invention, a printing device comprises a print process that is configured to determine whether sufficient consumable resources are currently available at the printing device to completely process first print data. If sufficient consumable resource are currently available at the printing device to completely process the first print data, then the first print data is processed and a printed version of data contained in the first print data is generated. If sufficient consumable resources are not currently available at the printing device to completely process the first print data, then second print data is processed and a printed version of data contained in the second print data is generated. The consumable resources currently available at the printing device are sufficient to completely process the second print data.

According to another aspect of the invention, a printing device comprises a print process that is configured to determine an amount of consumable resources currently available at the printing device. The print process is further configured to select, from a plurality of print data, particular print data to be processed based upon the amount of consumable resources currently available at the printing device being sufficient to completely process the particular print data.

According to another aspect of the invention, a printing device comprises a print process that is configured to determine whether a sufficient amount of one or more consumable resources is currently available at the printing device to completely process first print data, wherein the one or more consumable resources were designated to be used to process the first print data. If a sufficient amount of the one or more consumable resources is currently available at the printing device to completely process the first print data, then the first print data is processed using the one or more consumable resources and a printed version of data contained in the first print data is generated. If a sufficient amount of the one or more consumable resources is not currently available at the printing device to completely process the first print data, then the print process determines one or more other consumable resources that are currently available in sufficient quantities at the printing device to completely process the first print data. The print process then generates and transmits a notification to a client device. The notification both indicates that an insufficient amount of the one or more consumable resources is currently available at the printing device to completely process the first print data and identifies the one or more other consumable resources that are currently available in sufficient quantities at the printing device to completely process the first print data. The print process may be further configured to perform various actions based upon confirmation data received from a client device. If the confirmation data indicates that a user of the client device wishes to proceed to process the first print data with the one or more other consumable resources, then the first print data is processed using the one or more other consumable resources. If the confirmation data indicates that the user wishes to process the first print data with a particular consumable resource from the one or more other consumable resources, then the first print data is processed using the particular consumable resource. If the confirmation data indicates that a user of the client device does not wish to proceed to process the first print data with the one or more other consumable resources, then second print data is processed and a printed version of data contained in the second print data is generated, wherein the consumable resources currently available at the printing device are sufficient to completely process the second print data. The second print data may have been received at the printing device after the first print data, and thus the print data may be processed in a different order than in which it was received. The second print data may also be processed instead of the first print data in the situation where a specified time has elapsed since the notification was transmitted to the client device without receiving confirmation data from the client device, to avoid a blockage while waiting for user input from the client device.

BRIEF DESCRIPTION OF THE DRAWINGS

In the figures of the accompanying drawings like reference numerals refer to similar elements.

FIG. 3 is a block diagram of an arrangement that provides for local and central storage of print tags, according to one embodiment of the invention.

FIG. 4 is a flow diagram that depicts an approach for processing print data based upon available consumable resources at a printing device and resources required to completely process print data, according to one embodiment of the invention.

FIG. 5 is a flow diagram that depicts an approach for processing print data based upon current available consumable resources and resources required to completely process print data, according to another embodiment of the invention.

FIG. 6 is a diagram that depicts example interactions and notifications between a client device and a printing device, according to an embodiment of the invention.

FIG. 7 is a flow diagram that depicts an approach for processing print data based upon a notification transmitted to a client device and user input received from a client device, according to another embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. PRINT DATA MANAGEMENT ARCHITECTURE
III. MANAGING PROCESSING OF PRINT DATA BASED UPON AVAILABLE CONSUMABLE RESOURCES
IV. NOTIFICATIONS
V. IMPLEMENTATION MECHANISMS

I. Overview

An approach is provided for managing the processing of print data at a printing device based upon available consumable resources. According to the approach, a printing device includes a print process configured to determine consumable resources that are currently available at the printing device. The print process is further configured to determine which print data is to be processed based upon the consumable resources currently available at the printing device and the consumable resources required to completely process each of the print data. Print data that can be completely processed using the currently available consumable resources are selected for processing. This approach improves the utilization of available consumable resources and reduces blockages attributable to an insufficient amount of consumable resources being available to process particular print data. The print process may also be configured to cause a notification to be provided to a client device. The notification may indicate the consumable resources currently available at a printing device. This allows users at client devices to manage when they submit print data to a printing device to avoid blockages by first ensuring that the target printing device currently has the consumable resources required to completely process print data. The notification may also indicate that insufficient consumable resources were available to process particular print data and to recommend one or more alternative consumable resources to be used to process the particular print data. The printing device may receive confirmation data from the client device that indicates whether a user of the client device wishes to use any of the recommended alternative consumable resources to process the particular print data.

II. Print Data Management Architecture

Figure 1:
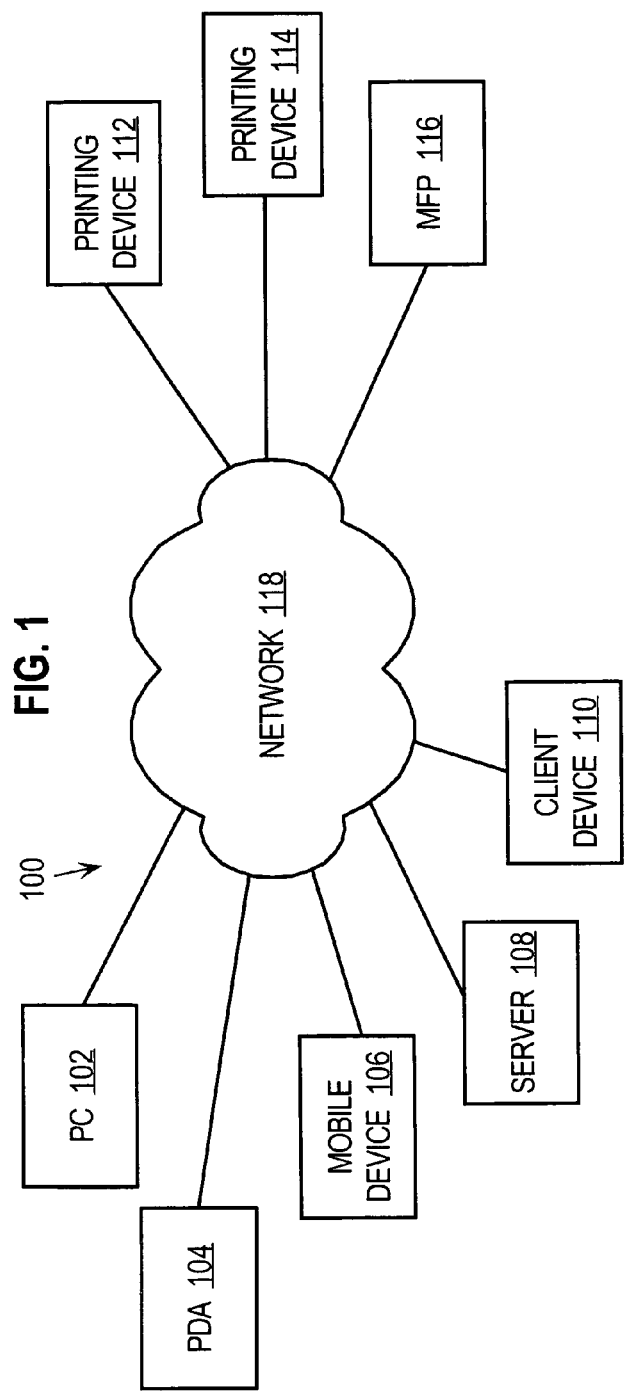
FIG. 1 is a block diagram that depicts an arrangement for managing printer driver settings according to an embodiment of the invention.

FIG. 1 is a block diagram that depicts an example arrangement 100 in which the approach for managing the processing of print data based upon available consumable resources, according to an embodiment of the invention, may be implemented. Arrangement 100 includes a personal computer (PC) (e.g., a desktop, laptop or workstation) 102, a personal digital assistant (PDA) 104, a mobile device 106, e.g., a cellular telephony or other wireless device, a server 108 and a client device 110 that are communicatively coupled to and transmit print data to printing devices 112, 114 and a multi-function peripheral (MFP) 116 for processing, via a network 118. Network 118 may be implemented by any medium or mechanism that provides for the exchange of data between the various elements depicts in FIG. 1. Examples of network 118 include, without limitation, a network such as a Local Area Network (LAN), Wide Area Network (WAN), Ethernet or the Internet, or one or more terrestrial, satellite or wireless links. The various elements depicted in FIG. 1 may also communicate via one or more direct communications links that are not depicted in FIG. 1 or described herein for purposes of brevity. Printing devices 112, 114 may be any type of printing device and the invention is not limited to any type of printing device. An example of printing devices 112, 114 is a network printer. Printing devices 112, 114 may also be Web services devices. MFP 116 may be any type of multi-function peripheral that at least includes a printing function.

Figure 2:
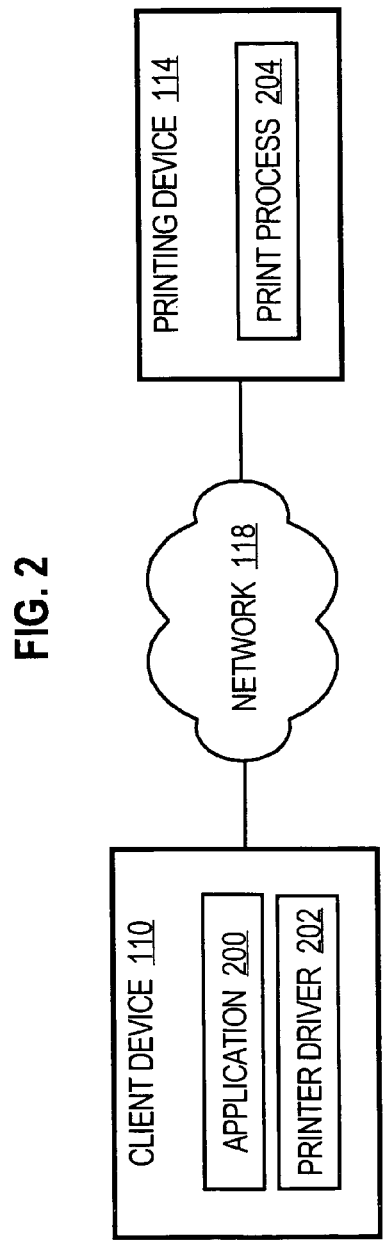
FIG. 2 is a block diagram that depicts the approach for managing the processing of print data based upon available consumable resources in the context of a client device and a printing device.

FIG. 2 is a block diagram that depicts the approach for managing the processing of print data based upon available consumable resources in the context of client device 110 and printing device 114. For simplicity, the other elements depicted in FIG. 1 are not depicted in FIG. 2, but the approach is applicable to any of the client devices and printing devices depicted in FIG. 1. As depicted in FIG. 2, client device 110 includes an application 200 and a printer driver 202. Application 200 may be any process or program that generates data to be printed on printing device 114. Examples of application 200 include, without limitation, a word processing program, an email client and a spreadsheet program. Printer driver 202 acts as a translator between client device 110 and printing device 114. More specifically, printer driver 202 receives print data from application 200 and formats the print data as required by printing device 114. Client device 110 may include additional modules and processes not depicted in FIG. 1 or described herein, depending upon the implementation.

Printing device 114 may be any type of device capable of generating printed versions of electronic data, such as electronic documents. Examples of printing device 104 include, without limitation, a printer and a multi-function peripherals (MFPs). Printing device 104 may include other modules and processes not depicted in FIG. 1 or described herein, depending upon the implementation. In this example, printing device 114 includes a print process 204 that is configured to process print data and generate printed versions of data contained within the print data. For example, print process 204 may process print data received from printer driver 202 and generate a printed version of an electronic document contained in the print data received from printer driver 202.

III. Managing Processing of Print Data Based Upon Available Consumable Resources FIG. 3 depicts an example implementation of printing device 114. In this example, printing device 114 includes a storage 300 that includes status data 302 and a print data queue 304. Storage 300 may be any type of storage including, without limitation, volatile memory, such as a random access memory (RAM), a non-volatile memory, such as one or more disks, or any combination of volatile and non-volatile memory. In the example depicted in FIG. 3, print data queue 304 includes print data 306, 308, 310 received by printing device 114 from one or more of PC 102, PDA 104, mobile device 106, server 108 and client device 110. It is also presumed that print data 306, 308, 310 have been received by printing device 114 in the order depicted in FIG. 3, namely first print data 306, then print data 308, then print data 3010.

Print data 306, 308, 310 is depicted as being stored in print data queue 304 for purposes of explanation only, and the approach is not limited to this example. Some printing devices may store reference information, such as a pointers, in the print data queues, while the print data itself is stored elsewhere on storage 300.

Status data 302 may include various types of data, depending upon a particular implementation. In the present example, status data 302 indicates the current available consumable resources on printing device 114. These include black and white toner, color toner, staples and three sizes of paper (8.5×11; A4 and legal). The current available consumable resources depicted in FIG. 3 are for explanation purposes only and the approach is not limited to these example consumable resources. Status data 302 may indicate the availability of particular consumable resources, for example, whether any black and white toner or staples are available or not. Status data 302 may also indicate amounts of available consumable resources. For example, status data 302 may indicate the amount of available black and white toner, e.g., as an absolute amount or as a percentage. Status data 302 may also indicate more specific information about the available consumable resources. For example, status data 302 may indicate a number of remaining staples or pages. Consumables, such as staples or paper, may be added to printing device 114 in specified amounts and printing device 114 may track the usage of these consumables to allow status data 302 to indicate a specific remaining amount of a consumable.

FIG. 3 also depicts the consumable resources required to completely process each of print data 306, 308, 310. Note that print data 306, 308, 310 require different consumable resources to be completely processed. For example, print data 306 requires staples and 8.5×11 size paper to be completely processed, while print data 308, 310 do not require staples or 8.5×11 size paper to be completely processed. As another example, print data 308 requires A4 size paper to be completely processed, while print data 306, 310 do not require A4 size paper to be completely processed. As yet another example, print data 310 requires color toner and legal size paper to be completely processed, while print data 306, 308 do not require color toner or legal size paper to be completely processed.

According to one embodiment of the invention, print process 204 is configured to select print data to be processed at a printing device based upon current available consumable resources at the printing device and resources required to completely process print data. FIG. 4 is a flow diagram 400 that depicts an approach for processing print data based upon current available consumable resources and resources required to completely process print data, according to an embodiment of the invention. In step 402, a printing device receives first print data and second print data. For example, printing device receives print data 306, 308. In step 404, the print process determines the consumable resources currently available at the printing device. For example, print process 204 determines the consumable resources currently available on printing device 114. Print process 204 may make this determination in a variety of ways. For example, print process 204 may consult status data 302 on storage 300. As another example, print process 204 may query printing device 114, for example by issuing a call to a routine.

In step 406, the print process determines whether sufficient consumable resources are currently available at the printing device to completely process the first print data. For example, print process 204 determines whether sufficient consumable resources are currently available at printing device 114 to completely process print data 306. In step 408, if sufficient consumable resources are currently available at the printing device to completely process the first print data, then the first print data is processed. For example, if sufficient consumable resources are currently available at printing device 114 to completely process print data 306, then print data 306 is processed.

In step 410, if sufficient consumable resources are not currently available at the printing device to completely process the first print data, then the second print data is processed, wherein sufficient consumable resources are currently available at the printing device to completely process the second print data. For example, suppose that there is an insufficient amount of staples (or no staples) currently available on printing device 114 to completely process print data 306, which requires staples. Then, print data 308 is processed, where sufficient consumable resources are currently available on printing device 114 to process print data 308. In the present example, print data 308 does not require staples and printing device 114 currently has sufficient black and white toner and A4 paper to completely process print data 308.

In the prior example, print process 204 evaluates the print data in the order in which it was received. That is, print process 204 first determines whether there are sufficient current consumable resources available on printing device 114 to completely process print data 306, since print data 306 was received before print data 308 and 310. If printing device 114 does not have sufficient current consumable resources to completely process print data 306, then print data 308 is evaluated, followed by print data 310. This approach allows print data that can be completely processed to be processed in the order in which it was received. The approach is not limited to this particular implementation, however, and other selection or ordering mechanisms may be used in conjunction with the consideration of consumable resources. FIG. 5 is a flow diagram 500 that depicts an approach for processing print data based upon current available consumable resources and resources required to completely process print data, according to an embodiment of the invention. In step 502, a plurality of print data is received by the printing device. For example, printing device 114 receives print data 306, 308, 310. In step 504, the print process determines the consumable resources currently available at the printing device. For example, print process 204 determines the consumable resources currently available on printing device 114. In step 506, print process 204 selects particular print data from the plurality of print data based upon the consumable resources currently available at the printing device 114 and the consumable resources required to completely process the particular print data. In this step, some print data is eliminated from consideration for selection based upon insufficient current resources to completely process the print data. For the print data that can be completely processed, any heuristic may be used to select the order in which the print data is processed. For example, print data may be processed based upon the amount of consumable resources that each print data requires, e.g., fewest consumable resources processed first. As another example, user specified priorities may be used to select the processing order.

IV. Notifications

According to one embodiment of the invention, print process 204 is configured to generate and transmit one or more notifications to any of the client devices depicted in FIG. 1, e.g., PC 102, PDA 104, mobile device 106, server 108 and client device 110. The particular form and content of a notification may vary depending upon a particular implementation and the invention is not limited to any particular form or content of notification. For example, a notification may indicate the consumable resources currently available on a printing device. In this situation, the notification may indicate an amount of an available consumable resource, for example as an absolute amount or as a percentage. A notification may also indicate how much of print data can be processed with the available consumable resources and allow a client device or user of a client device to confirm whether they would like the portion of print data that can be processed to be processed. If the client device or user indicates that the print data should not be partially processed, then the print data may be deleted from the printing device or simply stored for later processing. As an alternative, the client device or user may indicate that the print data is to be processed using a substitute consumable resource. For example, suppose that particular print data requires 50 pages of 8.5×11 paper and that a printing device only currently has 30 pages of 8.5×11 size paper available. The client device or user may be given the option of printing the first 30 pages of the print data on 8.5×11 size paper and the remaining 20 pages on A4 size paper. Alternatively, the client device or user may be given the option to print all 50 pages on A4 size paper. Many other substitution variations are possible with any type of consumable resource. These type of notifications allows client devices, applications and/or users to avoid blockages by determining which printing devices can completely process their print data before print data is sent to a printing device. Notifications may also be generated and transmitted to indicate that consumable resource(s) have been replenished. Notifications may also indicate other information, such as whether particular print data has been completely processed and if not, a reason why the particular print data could not be completely processed. Any criteria may be used for generating a notification. For example, a notification may be automatically generated and transmitted when the amount of a consumable resource falls below a specified amount or threshold or when a consumable resource is replenished. As another example, a notification may be periodically generated and transmitted, irrespective of the particular amount of a consumable resource that is available.

FIG. 6 is a diagram 600 that depicts example interactions and notifications between client device 110 and printing device 114, according to an embodiment of the invention. In step 602, printing device 114 determines the current consumable resource status. Printing device 114 may also update status data 302 to reflect the current consumable resource status. In step 604, printing device 114 generates and provides to client device 110 a notification of the current consumable resource status.

In step 606, client device 110 transmits first print data to printing device 114. The first print data requires consumable resources that are not currently available at printing device 114. Thus, the first print data cannot be completely processed by printing device 114 and will cause a blockage. In step 608, printing device 114 validates the consumable resource requirements of the first print data. This includes printing device 114 determining whether the current available consumable resources are sufficient to enable the first print data to be completely processed. In step 610, printing device 114 generates and provides to client device 110 a notification indicating that there are insufficient consumable resources currently available at printing device 114 to completely process the first print data.

In step 612, client device 110 transmits second print data to printing device 114 that requires consumable resources that are currently available at printing device 114. In step 614, printing device 114 validates the consumable resource requirements of the second print data. In this situation, printing device determines that the consumable resources currently available are sufficient to completely process the second print data. In step 616, printing device 114 generates and provides to client device 110 a notification indicating that the second print data has been processed.

In step 618, printing device 114 determines the current consumable resource status. Printing device 114 may also update status data 302 to reflect the current consumable resource status. In step 620, printing device 114 generates and provides to client device 110 a notification indicating that the consumable resources have been replenished.

In step 622, client device 110 transmits third print data to printing device 114. The third print data requires consumable resources that have been replenished and therefore can be completely processed at printing device 114 without causing a blockage. In step 624, printing device 114 generates and provides to client device 110 a notification indicating that the third print data has been processed.

According to another embodiment of the invention, notifications may be used in combination with user input received from a client device to manage the processing of print data on a printing device. FIG. 7 is a flow diagram 700 that depicts an approach for processing print data based upon a notification transmitted to a client device and user input received from a client device, according to another embodiment of the invention. In step 702, a printing device receives first print data and second print data. In step 704, a print process determines whether a sufficient amount of consumable resources is currently available at the printing device to completely process the first print data, wherein the one or more consumable resources were designated to be used to process the first print data. For example, the first print data may indicate that the first print data is to be processed using 8.5×11 size paper and color toner.

In step 706, if a sufficient amount of consumable resources is currently available at the printing device to completely process the first print data, then the first print data is processed using the one or more consumable resources. In step 708, if a sufficient amount of consumable resources is not currently available at the printing device to completely process the first print data, then one or more other consumable resources are determined that can be used. The one or more other consumable resources are currently available in sufficient quantities at the printing device to completely process the first print data.

In step 710, a notification is generated and transmitted to a client device. The client device may be, for example, the client device from which the first print data was received. The notification indicates that an insufficient amount of one or more consumable resources designated to be used to process the first print data is currently available at the printing device to completely process the first print data. The notification also indicates one or more other consumable resources that are currently available in sufficient quantities at the printing device to completely process the first print data. The processing of the notification at the client device may cause the one or more other consumable resources to be presented to a user of the client device. For example, a dialog box may be displayed to indicate to a user of the client device that an insufficient amount of one or more consumable resources is currently available at the printing device to completely process the first print data. The one or more other consumable resources may be presented, for example, in a list and the user may be allowed to choose one or more of the other consumable resources to be used in place of the consumable resource that was originally designated. For example, suppose that 8.5×11 paper was designated to be used to process the first print data when originally submitted to the printing device. Suppose further that the printing device determines that an insufficient amount of 8.5×11 paper is currently available at the printing device to completely process the first print data. Attempting to process the first print data on the printing device using 8.5×11 paper would therefore cause a blockage. The print process determines that there is a sufficient amount of A4 paper currently available on the printing device to completely process the first print data. The notification indicates this fact and A4 is presented to the user as an alternative at the client device. The notification may indicate multiple choices. For example, the notification may indicate both A4 and legal size paper as alternative choices for processing the first print data.

In step 712, confirmation data is received from the client device and processed and appropriate action is taken. According to one embodiment of the invention, the confirmation data reflects a desired action of the user of the client device. For example, if the confirmation data indicates that the user wishes to proceed to process the first print data using any of the one or more other consumable resources, e.g., A4 paper instead of 8.5×11 paper, then the first print data is processed using the one or more other consumable resources indicated in the confirmation data. If the confirmation data indicates that the user does not wish to proceed to process the first print data using the one or more other consumable resources, then the first print data is not processed. Instead second print data is processed, where the consumable resources currently available at the printing device are sufficient to completely process the second print data. For example, the second print data may indicate that A4 paper is to be used to process the second print data. A timeout mechanism may be used to prevent blockages from occurring while waiting for user input at a client device. For example, if no confirmation data is received from the client within a specified time of the notification being transmitted to the client device, then the second print data is processed instead of the first print data.

V. Implementation Mechanisms

Figure 8:
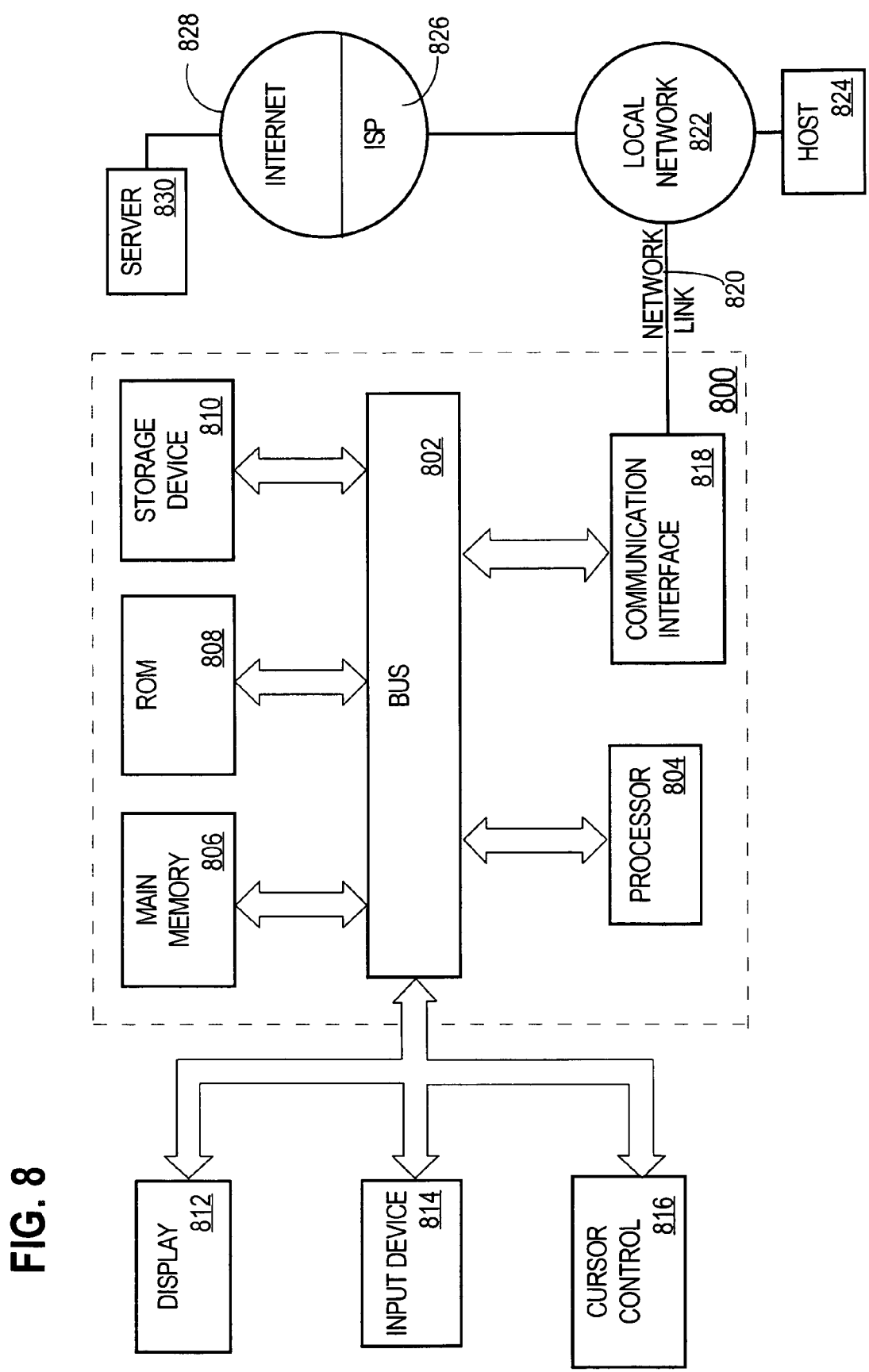
FIG. 8 is a block diagram of a computer system on which embodiments of the invention may be implemented.

The approach for managing the processing of print data at a printing device based upon available consumable resources reduces the occurrences of printing blockages and provides more user-friendly workflows than conventional printing approaches that do not provide notifications of available consumable resources. The approach may be implemented on any type of computing architecture or platform and the invention is not limited to any particular computing architecture or platform. For purposes of explanation, FIG. 8 is a block diagram that illustrates an example computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
one or more processors; and
a memory storing instructions which, when processed by the one or more processors, causes:
  determining whether a sufficient amount of one or more consumable resources is currently available at the printing device to completely process first print data, wherein the one or more consumable resources were designated to be used to process the first print data;
  if a sufficient amount of the one or more consumable resource is currently available at the printing device to completely process the first print data, then processing the first print data using the one or more consumable resources and causing a printed version of data contained in the first print data to be generated; and
  if a sufficient amount of the one or more consumable resources is not currently available at the printing device to completely process the first print data, then determining one or more other consumable resources that are different than the one or more consumable resources and that are currently available in sufficient quantities at the printing device to completely process the first print data,
  generating and transmitting to a client device a notification that both indicates that an insufficient amount of the one or more consumable resources is currently available at the printing device to completely process the first print data and identifies the one or more other consumable resources that are currently available in sufficient quantities at the printing device to completely process the first print data, and in response to receiving confirmation data from the client device that indicates that a user of the client device wishes to proceed to process the first print data with the one or more other consumable resources, then processing the first print data using the one or more other consumable resources and causing a printed version of data contained in the first print data to be generated.

2. The printing device recited in claim 1, wherein the memory stores additional instructions which, when processed by the one or more processors, causes in response to receiving confirmation data from the client device that indicates that a user of the client device wishes to proceed to process the first print data with a particular consumable resource from the one or more other consumable resources, then processing the first print data using the particular consumable resource and causing a printed version of data contained in the first print data to be generated.

3. The printing device recited in claim 1, wherein the memory stores additional instructions which, when processed by the one or more processors, causes in response to a specified time elapsing since the notification was transmitted to the client device without receiving confirmation data from the client device, then causing a printed version of data contained in other print data to be generated, wherein the consumable resources currently available at the printing device are sufficient to completely process the other print data.

4. The printing device recited in claim 3, wherein the other print data was received at the printing device after the first print data.

5. A printing device comprising:
one or more processors; and
a memory storing instructions which, when processed by the one or more processors, causes:
  determining whether a sufficient amount of one or more consumable resources is currently available at the printing device to completely process first print data, wherein the one or more consumable resources were designated to be used to process the first print data;
  if a sufficient amount of the one or more consumable resource is currently available at the printing device to completely process the first print data, then processing the first print data using the one or more consumable resources and causing a printed version of data contained in the first print data to be generated; and
  if a sufficient amount of the one or more consumable resources is not currently available at the printing device to completely process the first print data, then
    determining one or more other consumable resources that are different than the one or more consumable resources and that are currently available in sufficient quantities at the printing device to completely process the first print data,
    generating and transmitting to a client device a notification that both indicates that an insufficient amount of the one or more consumable resources is currently available at the printing device to completely process the first print data and identifies the one or more other consumable resources that are currently available in sufficient quantities at the printing device to completely process the first print data, and
    in response to receiving confirmation data from the client device that indicates that a user of the client device does not wish to proceed to process the first print data with the one or more other consumable resources, then processing other print data and causing a printed version of data contained in the other print data to be generated, wherein the consumable resources currently available at the printing device are sufficient to completely process the other print data.

6. The printing device recited in claim 5, wherein the other print data was received at the printing device after the first print data.

7. The printing device recited in claim 5, wherein the memory stores additional instructions which, when processed by the one or more processors, causes in response to receiving confirmation data from the client device that indicates that a user of the client device wishes to proceed to process the first print data with a particular consumable resource from the one or more other consumable resources, then processing the first print data using the particular consumable resource and causing a printed version of data contained in the first print data to be generated.

8. The printing device recited in claim 5, wherein the memory stores additional instructions which, when processed by the one or more processors, causes in response to a specified time elapsing since the notification was transmitted to the client device without receiving confirmation data from the client device, then causing the printed version of data contained in the other print data to be generated, wherein the consumable resources currently available at the printing device are sufficient to completely process the other print data.

9. The printing device recited in claim 8, wherein the other print data was received at the printing device after the first print data.

10. A non-transitory computer-readable storage medium for processing print data at a printing device, the non-transitory computer-readable storage medium storing instructions which, when processed by one or more processors, cause a print process on a printing device to:
determine whether a sufficient amount of one or more consumable resources is currently available at the printing device to completely process first print data, wherein the one or more consumable resources were designated to be used to process the first print data;
if a sufficient amount of the one or more consumable resource is currently available at the printing device to completely process the first print data, then processing the first print data using the one or more consumable resources and causing a printed version of data contained in the first print data to be generated; and
if a sufficient amount of the one or more consumable resources is not currently available at the printing device to completely process the first print data, then
  determining one or more other consumable resources that are different than the one or more consumable resources and that are currently available in sufficient quantities at the printing device to completely process the first print data,
  generating and transmitting to a client device a notification that both indicates that an insufficient amount of the one or more consumable resources is currently available at the printing device to completely process the first print data and identifies the one or more other consumable resources that are currently available in sufficient quantities at the printing device to completely process the first print data, and
  in response to receiving confirmation data from the client device that indicates that a user of the client device wishes to proceed to process the first print data with the one or more other consumable resources, then processing the first print data using the one or more other consumable resources and causing a printed version of data contained in the first print data to be generated.

11. The non-transitory computer-readable storage medium recited in claim 10, further storing additional instructions which, when processed by one or more processors, cause in response to receiving confirmation data from the client device that indicates that a user of the client device wishes to proceed to process the first print data with a particular consumable resource from the one or more other consumable resources, processing the first print data using the particular consumable resource and causing a printed version of data contained in the first print data to be generated.

12. The non-transitory computer-readable storage medium recited in claim 10, further storing additional instructions which, when processed by one or more processors, cause in response to a specified time elapsing since the notification was transmitted to the client device without receiving confirmation data from the client device, causing a printed version of data contained in other print data to be generated, wherein the consumable resources currently available at the printing device are sufficient to completely process the other print data.

13. The non-transitory computer-readable storage medium recited in claim 12, wherein the other print data was received at the printing device after the first print data.

14. A non-transitory computer-readable storage medium for processing print data at a printing device, the non-transitory computer-readable storage medium storing instructions which, when processed by one or more processors, cause a print process on a printing device to:
  determine whether a sufficient amount of one or more consumable resources is currently available at the printing device to completely process first print data, wherein the one or more consumable resources were designated to be used to process the first print data;
  if a sufficient amount of the one or more consumable resource is currently available at the printing device to completely process the first print data, then processing the first print data using the one or more consumable resources and causing a printed version of data contained in the first print data to be generated; and
  if a sufficient amount of the one or more consumable resources is not currently available at the printing device to completely process the first print data, then
    determining one or more other consumable resources that are different than the one or more consumable resources and that are currently available in sufficient quantities at the printing device to completely process the first print data,
    generating and transmitting to a client device a notification that both indicates that an insufficient amount of the one or more consumable resources is currently available at the printing device to completely process the first print data and identifies the one or more other consumable resources that are currently available in sufficient quantities at the printing device to completely process the first print data, and
    in response to receiving confirmation data from the client device that indicates that a user of the client device does not wish to proceed to process the first print data with the one or more other consumable resources, then processing other print data and causing a printed version of data contained in the other print data to be generated, wherein the consumable resources currently available at the printing device are sufficient to completely process the other print data.

15. The non-transitory computer-readable storage medium recited in claim 14, wherein the other print data was received at the printing device after the first print data.

16. The non-transitory computer-readable storage medium recited in claim 14, further storing additional instructions which, when processed by one or more processors, cause in response to receiving confirmation data from the client device that indicates that a user of the client device wishes to proceed to process the first print data with a particular consumable resource from the one or more other consumable resources, processing the first print data using the particular consumable resource and causing a printed version of data contained in the first print data to be generated.

17. The non-transitory computer-readable storage medium recited in claim 14, further storing additional instructions which, when processed by one or more processors, cause in response to a specified time elapsing since the notification was transmitted to the client device without receiving confirmation data from the client device, causing the printed version of data contained in the other print data to be generated, wherein the consumable resources currently available at The non-transitory computer-readable storage medium are sufficient to completely process the other print data.

18. The non-transitory computer-readable storage medium recited in claim 17, wherein the other print data was received at the printing device after the first print data.

19. A computer-implemented method for processing print data at a printing device, the computer-implemented method comprising a print process on a printing device:
  determining whether a sufficient amount of one or more consumable resources is currently available at the printing device to completely process first print data, wherein the one or more consumable resources were designated to be used to process the first print data;
  if a sufficient amount of the one or more consumable resource is currently available at the printing device to completely process the first print data, then processing the first print data using the one or more consumable resources and causing a printed version of data contained in the first print data to be generated; and
  if a sufficient amount of the one or more consumable resources is not currently available at the printing device to completely process the first print data, then
    determining one or more other consumable resources that are different than the one or more consumable resources and that are currently available in sufficient quantities at the printing device to completely process the first print data,
    generating and transmitting to a client device a notification that both indicates that an insufficient amount of the one or more consumable resources is currently available at the printing device to completely process the first print data and identifies the one or more other consumable resources that are currently available in sufficient quantities at the printing device to completely process the first print data, and
    in response to receiving confirmation data from the client device that indicates that a user of the client device wishes to proceed to process the first print data with the one or more other consumable resources, then processing the first print data using the one or more other consumable resources and causing a printed version of data contained in the first print data to be generated.

20. The computer-implemented method recited in claim 19, further comprising the print process in response to a specified time elapsing since the notification was transmitted to the client device without receiving confirmation data from the client device, causing a printed version of data contained in other print data to be generated, wherein the consumable resources currently available at the printing device are sufficient to completely process the other print data.

21. A computer-implemented method for processing print data at a printing device, the computer-implemented method comprising a print process on a printing device:
   determining whether a sufficient amount of one or more consumable resources is currently available at the printing device to completely process first print data, wherein the one or more consumable resources were designated to be used to process the first print data;
   if a sufficient amount of the one or more consumable resource is currently available at the printing device to completely process the first print data, then processing the first print data using the one or more consumable resources and causing a printed version of data contained in the first print data to be generated; and
   if a sufficient amount of the one or more consumable resources is not currently available at the printing device to completely process the first print data, then
      determining one or more other consumable resources that are different than the one or more consumable resources and that are currently available in sufficient quantities at the printing device to completely process the first print data,
      generating and transmitting to a client device a notification that both indicates that an insufficient amount of the one or more consumable resources is currently available at the printing device to completely process the first print data and identifies the one or more other consumable resources that are currently available in sufficient quantities at the printing device to completely process the first print data, and
      in response to receiving confirmation data from the client device that indicates that a user of the client device does not wish to proceed to process the first print data with the one or more other consumable resources, then processing other print data and causing a printed version of data contained in the other print data to be generated, wherein the consumable resources currently available at the printing device are sufficient to completely process the other print data.

22. The computer-implemented method recited in claim 21, further comprising the print process in response to a specified time elapsing since the notification was transmitted to the client device without receiving confirmation data from the client device, causing the printed version of data contained in the other print data to be generated, wherein the consumable resources currently available at the non-transitory computer-readable storage medium are sufficient to completely process the other print data.

* * * * *